(12) United States Patent
Yoshimi et al.

(10) Patent No.: US 7,982,830 B2
(45) Date of Patent: Jul. 19, 2011

(54) LIQUID CRYSTAL PANEL, AND LIQUID CRYSTAL DISPLAY DEVICE HAVING COLOR FILTER AND COMPENSATION LAYER

(75) Inventors: Hiroyuki Yoshimi, Ibaraki (JP); Kentarou Takeda, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 259 days.

(21) Appl. No.: 12/065,695

(22) PCT Filed: Apr. 19, 2007

(86) PCT No.: PCT/JP2007/058502
§ 371 (c)(1),
(2), (4) Date: Mar. 4, 2008

(87) PCT Pub. No.: WO2007/132629
PCT Pub. Date: Nov. 22, 2007

(65) Prior Publication Data
US 2009/0268133 A1    Oct. 29, 2009

(30) Foreign Application Priority Data

May 16, 2006  (JP) .................................. 2006-136341

(51) Int. Cl.
*G02F 1/1335* (2006.01)
(52) U.S. Cl. ......................... 349/107; 349/117; 349/118
(58) Field of Classification Search .......... 349/104–107, 349/117, 118
See application file for complete search history.

(56) References Cited

U.S. PATENT DOCUMENTS

| | | | |
|---|---|---|---|
| 6,565,974 B1 * | 5/2003 | Uchiyama et al. | 428/412 |
| 6,762,811 B2 * | 7/2004 | Sasaki et al. | 349/118 |
| 7,501,165 B2 * | 3/2009 | Ohmori et al. | 428/1.3 |
| 2004/0239852 A1 | 12/2004 | Ono et al. | |

(Continued)

FOREIGN PATENT DOCUMENTS

EP    1 435 541 A1    7/2004

(Continued)

OTHER PUBLICATIONS

International Search Report of PCT/JP2007/058502, date of mailing May 22, 2007.

*Primary Examiner* — Brian M. Healy
*Assistant Examiner* — Mary A El-Shammaa
(74) *Attorney, Agent, or Firm* — Westerman, Hattori, Daniels & Adrian, LLP

(57) ABSTRACT

The liquid crystal panel of the invention can restrain coloration following a change in the viewing angle when black is displayed, and can be produced into a relatively thin form. This panel has a liquid crystal cell 20 having a color filter having individual blue, green and red regions, a first polarizer 10 formed on one side of the cell 20, a second polarizer 40 formed on the other side of the cell 20, and a compensation layer 30 arranged between the first and second polarizers 10 and 40. The compensation layer 30 has an optical characteristic that the layer gives a larger retardation for a longer wavelength, and the cell 20 has a liquid crystal layer in a vertical alignment mode, and the thickness direction retardation values Rth(B), Rth(G) and Rth(R) of the liquid crystal cell to light transmitted through the individual color regions in the liquid crystal cell 20 satisfy: $|Rth(B)|<|Rth(G)|<|Rth(R)|$.

8 Claims, 6 Drawing Sheets

U.S. PATENT DOCUMENTS

| | | | |
|---|---|---|---|
| 2006/0061718 A1 | 3/2006 | Shibasaki et al. | |
| 2006/0103785 A1* | 5/2006 | Yamada et al. | 349/107 |
| 2006/0238685 A1* | 10/2006 | Shibasaki et al. | 349/119 |
| 2009/0316095 A1* | 12/2009 | Do et al. | 349/118 |
| 2010/0208181 A1* | 8/2010 | Fiebranz et al. | 349/119 |

FOREIGN PATENT DOCUMENTS

| | | |
|---|---|---|
| JP | 2001-290149 A | 10/2001 |
| JP | 2006-91083 A | 4/2006 |
| WO | 03/032060 A1 | 4/2003 |
| WO | WO 2006011298 A1 * | 2/2006 |

* cited by examiner

Equal Contrast ratio contour

Equal Contrast ratio contour

Equal Contrast ratio contour

Equal Contrast ratio contour

Equal Contrast ratio contour

LIQUID CRYSTAL PANEL, AND LIQUID CRYSTAL DISPLAY DEVICE HAVING COLOR FILTER AND COMPENSATION LAYER

BACKGROUND OF THE INVENTION

1. Field of the Invention

The present invention relates to a vertical aligned mode liquid crystal panel, and a liquid crystal display device.

2. Description of the Related Art

In the liquid crystal panel having a liquid crystal layer in vertical aligned mode, the long axis of the liquid crystal material is aligned substantially perpendicularly to its substrate surface when no voltage is applied thereto. Thus, when the liquid crystal panel is watched in the direction perpendicular to the substrate, the panel usually makes it possible to attain substantially complete black display to realize a high contrast.

However, when the vertical aligned mode liquid crystal panel is obliquely watched, there remains a problem that coloration is generated in black display by light leakage.

This problem is caused by both of an apparent shift of axes of its two polarizers arranged under a cross nicol condition and the thickness direction retardation of the liquid crystal cell.

Known is a liquid crystal panel in which in order to compensate for the axis shift of the polarizers, a retardation film is arranged which exhibits a characteristic that the film gives a substantially smaller retardation for a shorter wavelength, and further in order to compensate for the thickness direction retardation of the liquid crystal cell, a retardation film is arranged which exhibits a characteristic that the film gives a substantially larger retardation for a shorter wavelength (see Patent Document 1 as referred to hereinafter). In short, in this liquid crystal panel are arranged at least two retardation films having retardation wavelength-dispersion curves reverse to each other.

However, in the liquid crystal panel in the prior art, it is indispensable to arrange the two retardation films, which have different optical characteristics; therefore, the total thickness of the liquid crystal panel becomes large so that the liquid crystal panel cannot cope with a demand that liquid crystal panels should be made thin. Furthermore, the cost of this liquid crystal panel is high.

Patent Document 1: WO 2003/032060

SUMMARY OF THE INVENTION

An object of the present invention is to provide a liquid crystal panel which can restrain coloration following a change in the viewing angle when black is displayed and can be produced into a thin form; and a liquid crystal display device.

A liquid crystal panel of the present invention comprises a liquid crystal cell having a color filter having individual blue, green and red color regions, a first polarizer formed on one side of the liquid crystal cell, a second polarizer formed on the other side of the liquid crystal cell, and a compensation layer arranged between the first and second polarizers, wherein the compensation layer has an optical characteristic that the layer gives a larger retardation for a longer wavelength, and the liquid crystal cell has a liquid crystal layer in a vertical alignment mode, and the thickness direction retardation values Rth(B), Rth(G) and Rth(R) of the liquid crystal cell to light transmitted through the individual color regions in the liquid crystal cell satisfy the following relationship: |Rth(B)|<|Rth(G)|<|Rth(R)|.

Rth(B) represents the thickness direction retardation value of the liquid crystal cell to light transmitted through the blue regions of the cell and having a wavelength of 450 nm. Rth(G) represents the thickness direction retardation value of the liquid crystal cell to light transmitted through the green regions of the cell and having a wavelength of 546 nm. Rth(R) represents the thickness direction retardation value of the liquid crystal cell to light transmitted through the red regions of the cell and having a wavelength of 633 nm.

Any thickness direction retardation value Rth is represented by the following expression: $Rth=[\{(nx_1+ny_1)/2\}-nz_1] \times d$. In the expression, $nx_1$ represents the refractive index of the liquid crystal cell in the X axis direction in the plane of the cell (i.e., the direction along which the refractive index is maximum in the plane), $ny_1$ represents the refractive index of the liquid crystal cell in the Y axis direction in the plane of the cell (i.e., the direction perpendicular to the X axis in the plane), $nz_1$ represents the refractive index of the liquid crystal in the direction perpendicular to the X axis direction and the Y axis direction, and $d_1$ represents the thickness [nm] of the liquid crystal cell.

In the liquid crystal panel, the compensation layer, which exhibits an optical characteristic that the layer gives a larger retardation for a longer wavelength, is formed; therefore, the panel can compensate for an apparent axis shift of the polarizer pair.

Furthermore, the liquid crystal panel is formed in such a manner that the thickness direction retardation values Rth(B), Rth(G) and Rth(R) of the liquid crystal cell to light transmitted through the blue, green and red regions in the liquid crystal cell satisfy the following relationship: |Rth(B)|<|Rth(G)|<|Rth(R)|. For this reason, by action of the compensation layer, which exhibits an optical characteristic that the layer gives a larger retardation for a longer wavelength, the thickness direction retardation of liquid crystal cell can be satisfactorily compensated for.

Accordingly, the liquid crystal panel of the invention can restrain coloration following a change in the viewing angle when black is displayed. This liquid crystal panel is useful for various liquid crystal display devices.

Moreover, the liquid crystal panel of the invention makes it possible to compensate for the axis shift of the polarizers and the retardation of the liquid crystal cell by action of the compensation layer. For this reason, the liquid crystal panel of the invention makes the production costs thereof lower than conventional liquid crystal panels having two or more compensation layers having different optical characteristics. Furthermore, the invention can also make liquid crystal panels thinner.

Additionally, in a preferred embodiment of the liquid crystal panel of the invention, the compensation layer is made of a single layer. This liquid crystal panel can be made still thinner because of the single layer.

In a preferred embodiment of the liquid crystal panel of the invention, the liquid crystal cell is formed to satisfy Db<Dg<Dr wherein Db represents the thickness of the liquid crystal layer corresponding to the blue regions, Dg represents the thickness of the liquid crystal layer corresponding to the green regions, and Dr represents the thickness of the liquid crystal layer corresponding to the red regions. In general, the thickness direction retardation of a liquid crystal cell is affected mainly by the thickness of the liquid crystal layer, which may be called the cell gap. Thus, when the thickness of the liquid crystal layer is set to satisfy Db<Dg<Dr, a liquid crystal cell satisfying the relationship of |Rth(B)|<|Rth(G)|<|Rth(R)| can be formed.

Additionally, in a preferred embodiment of the liquid crystal panel of the invention, the compensation layer is a layer exhibiting an optical characteristic satisfying $nx_2>ny_2>nz_2$. In addition, $nx_2$ represents the refractive index of the compensation layer in the X axis direction in the plane of the layer (i.e., the direction along which the refractive index is maximum in the plane), $ny_2$ represents the refractive index of the compensation layer in the Y axis direction in the plane of the layer (i.e., the direction perpendicular to the X axis in the plane), and $nz_2$ represents the refractive index of the compensation layer in the direction perpendicular to the X axis direction and the Y axis direction. When a compensation layer having optical biaxiality is used in such a way, the axis shift of the polarizers and the thickness direction retardation of the liquid crystal cell can be compensated for by action of the single compensation layer.

In a preferred embodiment of the liquid crystal panel of the invention, the compensation layer is formed on the side of a backlight for the liquid crystal cell.

Additionally, in a preferred embodiment of the liquid crystal panel of the invention, the compensation layer comprises a cellulose film.

In a preferred embodiment of the liquid crystal panel of the invention, the compensation layer comprises a film having an aligned chain polymer having, as a repeat unit or repeat units, at least one of a structure represented by the following general formula I and a structure represented by the following general formula II.

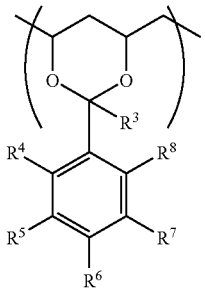

Formula I (In the general formula I, $R^3$ represents a hydrogen atom or an alkyl group having 1 to 8 carbon atoms. $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group provided that $R^4$ and $R^8$ are not simultaneously hydrogen atoms. $R^5$ to $R^7$ each independently represent a hydrogen atom or a substituent.)

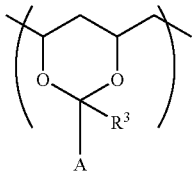

Formula II (In the general formula II, $R^3$ represents a hydrogen atom or an alkyl group having 1 to 8 carbon atoms. A represents a naphthyl group which may have a substituent, an anthranyl group which may have a substituent, or a phenanthrenyl group which may have a substituent provided that one or more carbon atoms which constitute the naphthyl group, the anthranyl group or the phenanthrenyl group may be substituted with one or more nitrogen atoms.)

The liquid crystal display device of the invention is a device having any one of the above-mentioned individual liquid crystal panels.

EXPLANATION OF REFERENCE NUMERALS

100 . . . a liquid crystal panel 10 . . . a first polarizer 20 . . . a liquid crystal cell 30 . . . a compensation layer 40 . . . a second polarizer

DETAILED DESCRIPTION OF THE PREFERRED EMBODIMENTS

Embodiments of the present invention will be described hereinafter.

<Structural Example of Liquid Crystal Panel>

Figure 1:
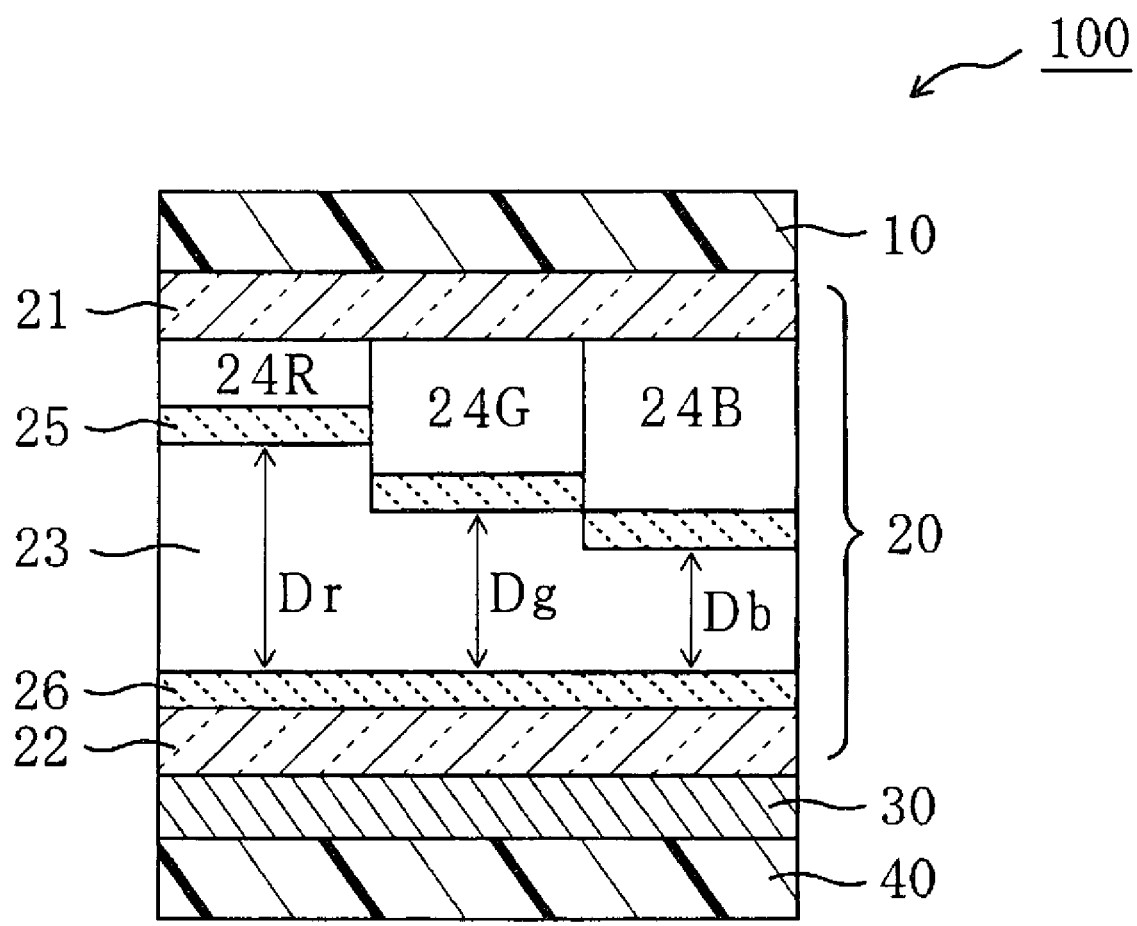
FIG. 1 is s schematic sectional view illustrating an embodiment of the liquid crystal panel of the invention.

In FIG. 1, a liquid crystal panel 100 is provided with a liquid crystal cell 20 having a color filter having blue, green and red color regions, a first polarizer 10 formed on one side of the liquid crystal cell 20 (the watching side thereof), a second polarizer 40 formed on the other side of the liquid crystal cell 20 (the backlight side thereof), and a compensation layer 30 arranged between the first polarizer 10 and the second polarizer 40. This compensation layer 30 is an optical member exhibiting an optical characteristic that the member gives a larger retardation for a longer wavelength (this optical characteristic may be referred to as "reverse wavelength dispersion" hereinafter). In the compensation layer 30 in the invention, the in-plane retardation thereof and the thickness direction retardation thereof each exhibit reverse wavelength dispersion. The structure of this compensation layer will be specifically detailed hereinafter.

As illustrated in FIG. 1, the compensation layer 30 is formed on the backlight side of the liquid crystal cell 20 (that is, between the liquid crystal cell 20 and the second polarizer 40); however, the compensation layer 30 may be formed on the watching side of the liquid crystal cell 20 (that is, between the liquid crystal cell 20 and the first polarizer 10). A compensation layer may be formed on each of the two sides. The compensation layer 30 is preferably bonded directly onto a surface of the liquid crystal cell 20 through an adhesive component such as a pressure-sensitive adhesive. However, another optical member may be interposed between the liquid crystal cell 20 and the compensation layer 30.

The two polarizers 10 and 40 are arranged in directions along which their absorption axes cross at right angles. The compensation layer 30 is arranged in such a manner that its slow axis (along which the in-plane refractive index becomes larger) is substantially perpendicular to the absorption axis of the second polarizer 40.

Various layers such as a protecting layer may be formed on the outer surface of each of the polarizers 10 and 40, each surface of the liquid crystal cell, or the like, which is not particularly illustrated.

The liquid crystal cell 20 has a pair of transparent substrates 21 and 22, a liquid crystal layer 23 having a liquid crystal material injected into a gap between the substrates 21 and 22, and a color filter formed on the substrate 21. The color filter has a blue filter 24B, a green filter 24G and a red filter 24R. A black matrix (not illustrated) is formed in a region where the color filters are not formed. An electrode 25 is formed on the liquid crystal layer 23 side of the color filter. On the substrate 22, which is an active matrix substrate 22, are formed an electrode 26, switching elements for controlling the electrooptic property of the liquid crystal, which are typically TFTs, scanning lines for giving gate signals to the switching elements, and signals lines for giving source signals to the switching elements (this situation is not illustrated). The interval between the substrates 21 and 22 is controlled by means of spacers (not illustrated). Besides, one or more known constituting members (not illustrated) may be fitted to the liquid crystal panel of the invention.

The liquid crystal layer of the liquid crystal cell in the invention is in a vertical aligned mode, which may be called a VA mode. In the vertical aligned mode liquid crystal cell, the long axis of the liquid crystal material is aligned substantially perpendicularly to the substrates when no voltage is applied to the cell. This vertical aligned mode liquid crystal cell is constructed by injecting, for example, a rodlike liquid crystal having a negative dielectric constant anisotropy into the liquid crystal layer.

<Thickness Direction Retardation of Liquid Crystal Cell>

The liquid crystal cell in the invention is formed in such a manner that the thickness direction retardation values Rth(B), Rth(G) and Rth(R) of the liquid crystal cell to light transmitted through individual color regions in the liquid crystal cell satisfy the following relationship: |Rth(B)|<|Rth(G)|<|Rth(R)|.

|Rth(B)|, |Rth(G)| and |Rth(R)| described above represent absolute values of Rth(B), Rth(G) and Rth(R), respectively.

Rth(B) represents the thickness direction retardation value of the liquid crystal cell to light transmitted through blue regions of the cell and having a wavelength of 450 nm, Rth(G) represents the thickness direction retardation value of the liquid crystal cell to light transmitted through green regions of the cell and having a wavelength of 546 nm, and Rth(R) represents the thickness direction retardation value of the liquid crystal cell to light transmitted through red regions of the cell and having a wavelength of 633 nm.

Any thickness direction retardation value Rth is the retardation value in the thickness direction at 23° C. to a wavelength λ [nm], and is calculated by the following expression 1:

$$Rth=[\{(nx_1+ny_1)/2\}-nz_1]\times d_1 \quad \text{(expression 1)}$$

In the expression 1, $nx_1$ represents the refractive index of the liquid crystal cell in the X axis direction in the plane of the cell (i.e., the direction along which the refractive index is maximum in the plane), $ny_1$ represents the refractive index of the liquid crystal cell in the Y axis direction in the plane of the cell (i.e., the direction perpendicular to the X axis in the plane), $nz_1$ represents the refractive index of the liquid crystal in the direction perpendicular to the X axis direction and the Y axis direction, and $d_1$ represents the thickness [nm] of the liquid crystal cell.

The reason why the wavelength of 450 nm, that of 546 nm and that of 633 nm, out of wavelengths of light transmitted through the blue regions, the green regions and the red regions, are used as benchmarks is that these wavelengths are central wavelengths giving a high transmittance in the respective color regions.

A liquid crystal layer and a color filter which constitute a liquid crystal cell have optical anisotropy, and the thickness direction retardation thereof is as large as it cannot be ignored. Accordingly, the phase of light having any wavelength transmitted through the liquid crystal cell is shifted. Thus, when the liquid crystal panel is obliquely watched, light leakage is generated.

However, the liquid crystal cell in the invention satisfies the relationship of |Rth(B)|<|Rth(G)|<|Rth(R)|, so that the thickness direction retardation of the liquid crystal cell can be satisfactorily compensated for by action of the compensation layer, which gives a larger retardation for a longer wavelength.

The Rth(B), Rth(G) and Rth(R) of the liquid crystal cell are not particularly limited as long as these satisfy the above-mentioned relationship.

For example, the difference between Rth(B) and Rth(G) (i.e., |Rth(G)|−|Rth(B)|) is preferably 10 nm or more, more preferably 20 nm or more. The upper limit thereof is preferably 50 nm.

The ratio between Rth(B) and Rth(G) (i.e., the ratio |Rth(B)|/|Rth(G)|) is preferably 0.90 or less, more preferably from 0.70 to 0.90, particularly more preferably from 0.75 to 0.90.

The difference between Rth(G) and Rth(R) (i.e., |Rth(R)|−|Rth(G)|) is preferably 5 nm or more, more preferably 10 nm or more, particularly more preferably 20 nm or more. The upper limit thereof is preferably 50 nm.

The ratio between Rth(G) and Rth(R) (i.e., the ratio |Rth(R)|/|Rth(G)|) is preferably 1.05 or more, more preferably from 1.05 to 1.20, particularly more preferably from 1.05 to 1.15.

The production of the liquid crystal cell satisfying the relationship of |Rth(B)|<|Rth(G)|<|Rth(R)| may be in accordance with various methods.

In general, a liquid crystal cell is composed of a pair of substrates, a liquid crystal layer, a color filter, an electrode element for driving the liquid crystal material, and other constituting members, as described above. Out of these constituting members, the liquid crystal layer and the color filter produce a large effect on the liquid crystal cell in a vertical aligned mode. The vertical aligned mode liquid crystal cell usually exhibits a wavelength dispersion that the cell gives a smaller retardation for a longer wavelength, which may be called normal wavelength dispersion. Accordingly, a liquid crystal cell satisfying the relationship can be produced by controlling the thickness direction retardations of its liquid crystal layer and its color filter.

Specifically, the process for producing the liquid crystal cell in the invention, which has the relationship, is, for example, a process (1) of varying the thickness of a liquid crystal layer in accordance with its individual color regions, a process (2) of varying the thickness direction retardations of individual color filters, and a process (3) of using both of the process (1) and (2).

The term "thickness direction retardation" may be denoted by "Rth" hereinafter.

The process (1) is very useful since the comparison of the Rth of a color filter with the Rth of a vertical aligned mode liquid crystal layer generally demonstrates that the Rth of the liquid crystal layer is larger. Accordingly, a liquid crystal cell satisfying the above-mentioned relationship can be produced only by adjusting the thickness of its liquid crystal layer.

Firstly, the process (1) of varying the thickness of a liquid crystal layer in accordance with its individual color regions may be a process of forming the liquid crystal layer to satisfy Db<Dg<Dr, as illustrated in FIG. 1, wherein "Db" represents the thickness of the liquid crystal layer corresponding to blue regions (that is, the thickness of the liquid crystal layer in regions wherein a blue filter is formed; substantially the same matter will be applied to the following green and red regions), "Dg" represents the thickness of the liquid crystal layer corresponding to green regions, and "Dr" represents the thickness of the liquid crystal layer corresponding to red regions.

The method for forming the liquid crystal layer to satisfy Db<Dg<Dr is, for example, a method (i) of varying the thicknesses of the individual color filters, or a method (ii) of making irregularities into a predetermined pattern in a substrate.

The method (i) is, for example, a method of painting colored compositions which constitute the individual color filters to satisfy the following: the thickness of the blue filter>that of the green filter>that of the red filter. Another example of the method (i) is a method of forming the individual color filters to have substantially the same thickness, painting a transparent material onto the blue filter to have an appropriate thickness, and further painting a transparent material on the green filter to have a smaller thickness than the transparent material on the blue filter.

The formation of the above-mentioned each filter (and the above-mentioned transparent material) can be performed by a printing method and a photolithographic method, for example. Examples of the printing method include flexographic printing, offset printing and screen printing. In the case of adopting the printing method, the printing thickness of a coloring composition composing each filter is determined for each color. In the case of the photolithographic method, a coloring composition is coated to an appropriate thickness to thereafter perform exposure and development. The coating thickness of a coloring composition in each color is determined for each color during coating. The coating can be performed by a spin coat method, for example. The adjustment of the coating thickness can be performed by adjusting the number of revolutions and time of revolution of a spin coater.

Next, examples of the above-mentioned method (ii) of forming irregularities on a substrate with a predetermined pattern include a method of forming irregularities in an interlayer insulating film on an active matrix substrate. For example, stepwise irregularities are formed so that a portion with a blue filter formed is formed most convexly and a portion with a red filter formed is formed concavely (or flat). This manner makes it possible to set the thicknesses corresponding to the individual color regions of the liquid crystal layer to satisfy Db<Dg<Dr. The above-mentioned irregularities formation can be realized by adjusting intensity and/or irradiation time of ultraviolet rays irradiated on a portion corresponding to a formation position of each filter on the occasion of forming an interlayer insulating film.

Secondly, the process (2) of varying the thickness direction retardations of individual color filters is a process of varying the Rth's of the individual color filters while the thickness of the liquid crystal layer is not varied in accordance with the individual color regions. This process makes it possible to produce a liquid crystal cell satisfying the relationship of |Rth(B)|<|Rth(G)|<|Rth(R)|. The method of varying the Rth's of the individual color filters is, for example, a method of varying the Rth's of coloring matter carrier resins in the blue, green and red regions.

It is preferred to use, as the coloring matter carrier resin in the regions in at least one of the colors, a resin having a Rth different from the Rth's of the coloring matter carrier resins in the regions in the other colors, and it is also preferred to use, as all the coloring matter carrier resins in the blue, green and red regions, resins having Rth's different from each other.

Colored compositions for the color filters and a process for forming the same will be described in detail later.

Rth of the coloring matter carrier resin can be controlled by a method (a) of controlling viscosity of a resin during dissolution, a method (b) of controlling $\Delta n$ (birefringence) of a resin and the like.

With regard to a method (a) of controlling viscosity of a resin during dissolution, the use of two kinds of transparent resins different in molecular-weight distribution allows a high Rth transparent resin and a low Rth transparent resin to be prepared.

A resin having a higher molecular weight easily causes intermolecular tangling, so that viscosity is increased even though concentration is the same when being dissolved in a solvent. Therefore, the molecular state is fixed at an earlier stage in the drying process after coating. Thus, when Rth is developed in the further drying process thereafter, a relatively high Rth is caused as compared with the use of a resin having a lower molecular weight. Cross-linking in this state by electron rays, heat or other methods allows a cured matter having a controlled Rth to be obtained.

Next, with regard to another form of a method (a) of controlling viscosity of a resin during dissolution, the use of two kinds of transparent resins different in intermolecular interaction allows a high Rth transparent resin and a low Rth transparent resin to be prepared. For example, between a resin having a functional group in a side chain and a resin having no functional group therein, a resin having a functional group is higher in viscosity, so that a relatively high Rth is caused for the same reason as described above.

Rth can also be controlled by a method of substituting a hydrogen group and a hydrocarbon group with a fluorine group.

Rth can also be controlled to some degree by changing the kind and concentration of the solvent in coating a mixture of a coloring matter carrier and a pigment. In the case where solvent viscosity during curing is relatively low, a low Rth color filter can be formed.

Next, examples of a method of controlling $\Delta n$ of a resin include the use of different kinds of resins. For example, an epoxy resin is generally low in the retardation value in the thickness direction as compared with a polyimide resin. The use of different resins as the coloring matter carrier resin of a coloring composition in each color region allows Rth in each color region to be controlled.

In the case of fixing a main chain skeleton, the substitution of a side chain with an element higher in electrophilicity allows Rth to be lowered. On the other hand, increase of conjugated electrons in a main chain skeleton, for example, the introduction of an aromatic ring allows Rth to be raised.

<A Material and a Process for Forming the Color Filter>

Each color region of a color filter is formed by coating a coloring composition on a transparent substrate on the visible side. A coloring composition has a transparent resin, a coloring matter carrier comprising a precursor thereof and a coloring matter, and preferably contains a photopolymerization initiator.

The transparent resin is a resin having a transmittance of preferably 80% or more, more preferably 95% or more in the whole wavelength range of 400 to 700 nm in the visible light range.

The transparent resin contains a thermoplastic resin, a thermosetting resin and a photosensitive resin, and a precursor thereof contains a monomer or an oligomer, which is cured by radiation exposure to produce a transparent resin. These may be used alone or in the form of a mixture of two or more thereof.

Examples of the thermoplastic resin include butyral resin, a styrene-maleic acid copolymer, chlorinated polyethylene, chlorinated polypropylene, polyvinyl chloride, a vinyl chloride-vinyl acetate copolymer, polyvinyl acetate, polyurethane resin, polyester resin, acrylic resin, alkyd resin, polystyrene, polyamide resin, gum resin, cyclized rubber resin, celluloses, polyethylene, polybutadiene and polyimide resin.

Examples of the thermosetting resin include epoxy resin, benzoguanamine resin, rosin modified maleic resin, rosin modified fumaric resin, melamine resin, urea resin and phenolic resin.

Examples of the photosensitive resin to be used include a resin in which a linear macromolecule having reactive substituents such as a hydroxyl group, a carboxyl group and an amino group is reacted with a (meth)acrylic compound and cinnamic acid having reactive substituents such as an isocyanate group, an aldehyde group and an epoxy group to introduce photo-crosslinkable groups such as a (meth)acryloyl group and a styryl group into the linear macromolecule.

Also, examples thereof include a resin in which a linear macromolecule containing acid anhydrides such as a styrene-maleic anhydride copolymer and an α-olefin-maleic anhydride copolymer is half-esterified by a (meth)acrylic compound having a hydroxyl group such as hydroxyalkyl (meth)acrylate.

Examples of the monomer and the oligomer contained in a precursor include acrylates and methacrylates of various kinds such as methyl (meth)acrylate, ethyl (meth)acrylate, 2-hydroxyethyl (meth)acrylate, 2-hydroxypropyl (meth)acrylate, cyclohexyl (meth)acrylate, β-carboxyethyl (meth)acrylate, polyethylene glycol di(meth)acrylate, 1,6-hexanediol di(meth)acrylate, triethylene glycol di(meth)acrylate, tripropylene glycol di(meth)acrylate, trimethylolpropane tri(meth)acrylate, pentaerythritol tri(meth)acrylate, 1,6-hexanediol diglycidyl ether di(meth)acrylate, bisphenol A diglycidyl ether di(meth)acrylate, neopentyl glycol diglycidyl ether di(meth)acrylate, dipentaerythritol hexa(meth)acrylate, tricyclodecanyl (meth)acrylate, ester acrylate, (meth)acrylate of methylolated melamine, epoxy (meth)acrylate and urethane acrylate, (meth)acrylic acid, styrene, vinyl acetate, hydroxyethyl vinyl ether, ethylene glycol divinyl ether, pentaerythritol trivinyl ether, (meth)acrylamide, N-hydroxymethyl (meth)acrylamide, N-vinyl formamide, and acrylonitrile.

These may be used alone or in the form of a mixture of two or more thereof.

Organic or inorganic pigments can be used singly of one kind or by mixture of two kinds or more as a coloring matter contained in the coloring composition.

A pigment high in chromogenic properties and heat resistance, particularly, a pigment high in resistance to thermal decomposition is preferable among pigments; an organic pigment is ordinarily used.

Specific examples of the organic pigment usable for the coloring composition of the present invention are hereinafter shown by color index numbers.

Examples of a red photosensitive coloring composition for forming a red region to be used include red pigments such as C. I. Pigment Red 1, 2, 3, 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 246, 254, 255, 264, 272 and 279.

The red photosensitive coloring composition can be used together with a yellow pigment and an orange pigment.

Examples of a green photosensitive coloring composition for forming a green region to be used include green pigments such as C. I. Pigment Green 7, 10, 36 and 37.

The green photosensitive coloring composition can be used together with a yellow pigment.

Examples of a blue photosensitive coloring composition for forming a blue region to be used include blue pigments such as C. I. Pigment Blue 15, 15:1, 15:2, 15:3, 15:4, 15:6, 16, 22, 60, 64 and 80.

The blue photosensitive coloring composition can be used together with violet pigments such as C. I. Pigment Violet 1, 19, 23, 27, 29, 30, 32, 37, 40, 42 and 50.

Examples of a black photosensitive coloring composition for forming a black matrix to be used include carbon black, aniline black, anthraquinone black pigment and perylene black pigment; specifically, C. I. Pigment Black 1, 6, 7, 12, 20 and 31.

A mixture of a red pigment, a blue pigment and a green pigment can be used for the black photosensitive coloring composition.

With regard to a black pigment, carbon black is preferable in view of price and light shielding properties, and may be surface-treated with a resin.

In order to adjust color tone, the black photosensitive coloring composition can be used together with a blue pigment and a violet pigment.

Carbon black preferably has a specific surface area of 50 to 200 $m^2/g$ by a BET method from the viewpoint of the black matrix shape. The reason therefor is that deterioration in the black matrix shape is caused in the case of using carbon black having a specific surface area of less than 50 $m^2/g$, while a dispersing aid is excessively adsorbed in carbon black to cause the necessity of blending a large amount of a dispersing aid for developing physical properties in the case of using carbon black having a specific surface area of more than 200 $m^2/g$.

Carbon black preferably has the oil absorption amount of dibutyl phthalate (hereinafter referred to as 'DBP') of 120 cc/100 g or less in view of sensitivity; lower oil absorption amount thereof is more preferable.

In addition, the average primary particle diameter of carbon black is preferably 20 to 50 nm. Carbon black having an average primary particle diameter of less than 20 nm causes dispersion at high concentration to be difficult, so that a photosensitive black composition having favorable temporal stability is hardly obtained. On the other hand, the use of carbon black having an average primary particle diameter of more than 50 nm occasionally brings deterioration in the black matrix shape.

Examples of the inorganic pigment include metallic oxide powders such as colcothar (ferric oxide red), cadmium red, ultramarine blue, prussian blue, chrome oxide green, cobalt green, umber, titanium black and synthetic iron black, metallic sulfide powders, and metal powders.

The Inorganic pigment is used in combination with an organic pigment for securing favorable application properties, sensitivity and developability while balancing chroma and brightness. The coloring composition of the present invention can contain dyestuffs for toning within a range of not deteriorating heat resistance.

Each coloring composition can contain a solvent. The reason therefor is that a coloring matter is sufficiently dispersed in a coloring matter carrier and applied on a transparent substrate so as to be a predetermined dried film thickness to facilitate the formation of each color region and a black matrix.

Examples of the solvent include cyclohexanone, ethyl cellosolve acetate, butyl cellosolve acetate, 1-methoxy-2-propyl acetate, diethylene glycol dimethyl ether, ethyl benzene, ethylene glycol diethyl ether, xylene, ethyl cellosolve, methyl-n-amyl ketone, propylene glycol monomethyl ether, toluene, methyl ethyl ketone, ethyl acetate, methanol, ethanol, isopropyl alcohol, butanol, isobutyl ketone and a petroleum solvent. These may be used alone or in the form of a mixture of two or more thereof.

A coloring composition can be produced in such a manner that a coloring matter or a coloring matter composition comprising two kinds or more of coloring matters is minutely dispersed in a coloring matter carrier and a solvent preferably together with a photopolymerization initiator by using various dispersing means such as a triple roll mill, a double roll mill, a sand mill, a kneader and an attritor.

Also, a photosensitive coloring composition containing two kinds or more of coloring matters can be produced in such a manner that each coloring matter is separately dispersed minutely in a coloring matter carrier and a solvent to mix the dispersion.

Dispersing aids such as a resin pigment dispersing agent, a surface-active agent and a coloring matter derivative can properly be contained on the occasion of dispersing a coloring matter in a coloring matter carrier and a solvent.

The dispersion auxiliary has a large effect of dispersing a pigment sufficiently and preventing the dispersed pigment from aggregating again. Thus, in the case of using a photosensitive colored composition wherein the dispersion auxiliary is used to disperse a pigment into a colorant carrier and a solvent, a color filter excellent in transparency is obtained.

The resin pigment dispersing agent has a pigment affinity site having a property of being adsorbed in a pigment, and a site compatible with a coloring matter carrier. The resin pigment dispersing agent is adsorbed in a pigment to offer the function of stabilizing dispersion of the pigment in a coloring matter carrier.

Examples of the resin pigment dispersing agent include polycarboxylate esters such as polyurethane and polyacrylate, unsaturated polyamide, polycarboxylic acid, polycarboxylic acid (partial) amine salt, polycarboxylic acid ammonium salt, polycarboxylic acid alkylamine salt, polysiloxane, long-chain polyaminoamide phosphate, hydroxyl group-containing polycarboxylate ester and modified products thereof, oily dispersing agents such as amide and salts thereof, formed by reaction of poly(lower alkyleneimine) and polyester having a free carboxyl group, a (meth)acrylic acid-styrene copolymer, a (meth)acrylic acid-(meth)acrylate copolymer, a styrene-maleic acid copolymer, water-soluble resins and water-soluble polymeric compounds such as polyvinyl alcohol and polyvinyl pyrrolidone, polyesters, modified polyacrylates, an ethylene oxide/propylene oxide addition compound, and phosphates.

These may be used alone or in the form of a mixture of two or more thereof.

Examples of the surface-active agent include anionic surface-active agents such as sodium lauryl sulfate, polyoxyethylene alkyl ether sulfate, sodium dodecylbenzene sulfonate, an alkaline salt of a styrene-acrylic acid copolymer, sodium stearate, sodium alkylnaphthalene sulfonate, sodium alkyl diphenyl ether disulfonate, monoethanolamine lauryl sulfate, triethanolamine lauryl sulfate, ammonium lauryl sulfate, monoethanolamine stearate, sodium lauryl sulfate, monoethanolamine of a styrene-acrylic acid copolymer and polyoxyethylene alkyl ether phosphate; nonionic surface-active agents such as polyoxyethylene oleyl ether, polyoxyethylene lauryl ether, polyoxyethylene nonylphenyl ether, polyoxyethylene sorbitan monostearate and polyethylene glycol monolaurate; cationic surface-active agents such as quaternary alkyl ammonium salt and ethylene oxide adduct thereof; and amphoteric surface-active agents such as alkyl betaine, for example, betaine alkyl dimethyl aminoacetate and alkyl imidazoline.

These may be used alone or in the form of a mixture of two or more thereof.

The coloring matter derivative is a compound in which a substituent is introduced into an organic coloring matter, and the organic coloring matter contains an aromatic polycyclic compound in pale yellow such as naphthalene and anthraquinone, which are not generally called coloring matters.

Examples of the coloring matter derivative to be used include those described in Japanese Unexamined Patent Publication No. Sho 63-305173, Japanese Examined Patent Publication Nos. Sho 57-15620, Sho 59-40172, Sho 63-17102 and Hei 5-9469. These may be used alone or in the form of a mixture of two or more thereof.

Examples of the photopolymerization initiator to be used include acetophenone compounds such as 4-phenoxydichloroacetophenone, 4-tert-butyl-dichloroacetophenone, diethoxyacetophenone, 1-(4-isopropylphenyl)-2-hydroxy-2-methylpropane-1-one, 1-hydroxycyclohexylphenyl ketone and 2-benzyl-2-dimethylamino-1-(4-morpholinophenyl)-butane-1-one, benzoin compounds such as benzoin, benzoin methyl ether, benzoin ethyl ether, benzoin isopropyl ether and benzyldimethyl ketal, benzophenone compounds such as benzophenone, benzoylbenzoic acid, methyl benzoylbenzoate, 4-phenylbenzophenone, hydroxybenzophenone, acrylated benzophenone, 4-benzoyl-4'-methyldiphenyl sulfide and 3,3',4,4'-tetra(tert-butylperoxycarbonyl)benzophenone, thioxanthone compounds such as thioxanthone, 2-chlorthioxanthone, 2-methylthioxanthone, isopropylthioxanthone, 2,4-diisopropylthioxanthone and 2,4-diethylthioxanthone, triazine compounds such as 2,4,6-trichloro-s-triazine, 2-phenyl-4,6-bis(trichloromethyl)-s-triazine, 2-(para-methoxyphenyl)-4,6-bis(trichloromethyl)-s-triazine, 2-(para-tolyl)-4,6-bis(trichloromethyl)-s-triazine, 2-piperonyl-4,6-bis(trichloromethyl)-s-triazine, 2,4-bis(trichloromethyl)-6-styryl-s-triazine, 2-(naphtho-1-yl)-4,6-bis(trichloromethyl)-s-triazine, 2-(4-methoxy-naphtho-1-yl)-4,6-bis(trichloromethyl)-s-triazine, 2,4-trichloromethyl-(piperonyl)-6-triazine and 2,4-trichloromethyl(4'- methoxystyryl)-6-triazine, oxime ester compounds such as 1,2-octanedione, 1-[4-(phenylthio)-2-(O-benzoyloxime)] and O-(acetyl)-N-(1-phenyl-2-oxo-2-(4'-methoxy-naphtyl) ethylidene)hydroxylamine, phosphine compounds such as bis(2,4,6-trimethylbenzoyl)phenylphosphine oxide and 2,4, 6-trimethylbenzoyldiphenylphosphine oxide, quinone compounds such as 9,10-phenanthrene quinone, camphorquinone and ethyl anthraquinone, borate compounds, carbazole compounds, imidazole compounds, and titanocene compounds. These photopolymerization initiators can be used singly of one kind or by mixture of two kinds or more.

The used amount of the photopolymerization initiator is preferably 0.5 to 45% by mass, more preferably 3 to 30% by mass and further preferably 4 to 10% by mass on the basis of the total solid content of the photosensitive coloring composition.

In addition, a sensitizer including amine compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-dimethylaminoethyl benzoate, 2-ethylhexyl 4-dimethylaminobenzoate, N,N-dimethylpara-toluidine, 4,4'-bis(dimethylamino)benzophenone, 4,4'-bis(diethylamino)benzophenone and 4,4'-bis(ethylmethylamino)benzophenone may be used together. These sensitizers can be used singly of one kind or by mixture of two kinds or more.

Among the above-mentioned sensitizers, 4,4'-bis(dimethylamino)benzophenone and 4,4'-bis(diethylamino)benzophenone are preferable, and 4,4'-bis(diethylamino)benzophenone is more preferable.

The used amount of the sensitizer is preferably 0.5 to 55% by mass, more preferably 2.5 to 40% by mass and further preferably 3.5 to 25% by mass on the basis of the total amount of the photopolymerization initiator and the sensitizer.

Furthermore, a polyfunctional thiol, which acts as a chain transfer agent, may be incorporated into the photosensitive colored composition.

The polyfunctional thiol may be any compound having two or more thiol groups. Examples thereof include hexanedithiol, decanedithiol, 1,4-butanediol bisthiopropionate, 1,4-butanediol bisthioglycolate, ethylene glycol bisthioglycolate, ethylene glycol bisthiopropionate, trimethylolpropane tristhioglycolate, trimethylolpropane tristhiopropionate, trimethylolpropane tris(3-mercaptobutyrate), pentaerythritol tetrakisthioglycolate, pentaerythritol tetrakisthiopropionate, trimercaptopropionic acid tris(2-hydroxyethyl)isocyanurate, 1,4-dimethylmercaptobenzene, 2,4,6-trimercapto-s-triazine, and 2-(N,N-dibutylamino)-4,6-dimercapto-s-triazine. These polyfunctional thiols may be used alone or in the form of a mixture of two or more thereof.

The used amount of the polyfunctional thiol is preferably 0.1 to 30% by mass, more preferably 1 to 20% by mass on the basis of the total solid content of the photosensitive coloring composition.

The photosensitive coloring composition can be prepared in the form of a coloring resist material of solvent development type or alkaline development type. The coloring resist material is a material in which a coloring matter is dispersed in a composition containing a thermoplastic resin, a thermosetting resin or a photosensitive resin, a monomer, a photopolymerization initiator, and a solvent. The coloring matter is preferably contained at a ratio of 5 to 70% by mass, more preferably 20 to 50% by mass on the basis of the total solid content of the photosensitive coloring composition, and the residual amount thereof is substantially composed of a resinous binder offered by a coloring matter carrier.

It is preferred to remove, from the photosensitive colored composition, coarse particles having a particle diameter of 5 µm or more, preferably 1 µm or more, more preferably 0.5 µm or more, and incorporated dust by means of a centrifugal separator, a sintered filter, a membrane filter, or the like.

In the formation of each of the individual color regions and the black matrix, a photosensitive colored composition prepared into a solvent-developable or an alkali-developable colored resist material is painted into a predetermined dry thickness on a transparent substrate by spray coating, spin coating, slit coating, roll coating or some other coating method. The film, dried as required, is subjected to ultraviolet exposure through a mask having a predetermined pattern provided in contact or non-contact with this film. Thereafter, the film is immersed in a solvent or an alkaline developing solution, or is sprayed with the developing solution by a spray to remove uncured portions and then formed into a desirable pattern. In addition, in order to promote polymerization of the coloring resist material, heating can be performed as required. A black matrix and each color region are sequentially formed on a transparent substrate, so that a color filter can be formed thereon. Such a photolithographic method allows each color region and a black matrix to be formed with higher accuracy than a printing method.

On the occasion of development, an aqueous solution of sodium carbonate, sodium hydroxide and the like is used as the alkaline developing solution. An organic alkali such as dimethylbenzylamine and triethanolamine can also be used as the alkaline developing solution. An antifoaming agent and a surface-active agent can also be added to the developing solution.

A shower development method, a spray development method, a dip (immersion) development method and a puddle (liquid heap) development method can be applied as development processing methods.

In order to improve ultraviolet exposure sensitivity, after the above-mentioned coloring resist material is applied and dried, a water-soluble or alkali-soluble resin such as polyvinyl alcohol and water-soluble acrylic resin can also be applied and dried to form a film for preventing inhibition of polymerization due to oxygen and thereafter perform ultraviolet exposure.

<Compensation Layer>

The compensation layer of the present invention is a compensation layer exhibiting reverse wavelength dispersion. The compensation layer may be made of a single layer or plural layers. When the compensation layer is made of a single layer, a sufficiently thin and light liquid crystal panel can be provided.

The compensation layer used in the liquid crystal panel of the invention is preferably a compensation layer exhibiting reverse wavelength dispersion and optical biaxiality (for example, $nx_2 > ny_2 > nz_2$ wherein $nx_2$ represents the refractive index of the compensation layer in the X axis direction in the plane of the layer (i.e., the direction along which the refractive index is maximum in the plane), $ny_2$ represents the refractive index of the compensation layer in the Y axis direction in the plane of the layer, and $nz_2$ represents the refractive index of the compensation layer in the direction perpendicular to the X axis direction and the Y axis direction.). This is because the use of the compensation layer, which exhibits the optical property, makes it possible to compensate for the axis shift of the polarizers and the thickness direction retardation of the liquid crystal cell. The use of this optically biaxial compensation layer also makes it unnecessary to use two compensation layers.

The compensation layer exhibiting reverse wavelength dispersion satisfies, for example, Re(450)<Re(550)<Re(650), and Rth(450)<Rth(550)<Rth(650).

Re(450), Re(550) and Re(650) represent the in-plane retardation values of the compensation layer at 23° C. to wavelengths of 450 nm 550 nm and 650 nm, respectively. The in-plane retardation value Re(λ) is calculated from the following expression 2:

$$Re(\lambda)=(nx_2-ny_2)\times d_2 \qquad \text{(expression 2)}$$

wherein λ represents any wavelength.

Rth(450), Rth(550) and Rth(650) represent the thickness direction retardation values of the compensation layer at 230° C. to wavelengths of 450 nm, 550 nm and 650 nm, respectively. The thickness direction retardation value Rth(λ) is calculated from the following expression 3:

$$Rth(\lambda)=[\{(nx_2+ny_2)/2\}-nz_2]\times d_2 \qquad \text{(expression 3)}$$

wherein λ represents any wavelength.

In the expressions 2 and 3, $nx_2$ represents the refractive index of the compensation layer in the X axis direction in the plane of the layer (i.e., the direction along which the refractive index is maximum in the plane), $ny_2$ represents the refractive index of the compensation layer in the Y axis direction in the plane of the layer, $nz_2$ represents the refractive index of the compensation layer in the direction perpendicular to the X axis direction and the Y axis direction, and $d_2$ represents the thickness (nm) of the compensation layer.

The Re(550) of the compensation layer can be appropriately designed. For example, the Re(550) of the compensation layer is 10 nm or more, preferably from 30 to 300 nm, more preferably from 50 to 200 nm, particularly more preferably from 50 to 100 nm.

The ratio between Re(550) and Re(450) (the ratio Re(450)/Re(550)) of the compensation layer is preferably 0.90 or less, more preferably from 0.70 to 0.90, particularly more preferably from 0.75 to 0.90, most preferably from 0.80 to 0.90.

The ratio between Re(650) and Re(550) (the ratio Re(650)/Re(550)) of the compensation layer is preferably 1.05 or more, more preferably from 1.05 to 1.20, particularly more preferably from 1.05 to 1.15, most preferably from 1.05 to 1.10.

The Rth(550) of the compensation layer can also be appropriately designed. For example, the Rth(550) of the compensation layer is 10 nm or more, preferably from 50 to 500 nm, more preferably from 70 to 400 nm.

The difference between Rth(550) and Rth(450) (Rth(550)−Rth(450)) is preferably 10 nm or more, more preferably 20 nm or more, particularly more preferably 30 nm or more. The upper limit thereof is preferably 60 nm, more preferably 50 nm.

The ratio between Rth(550) and Rth (450) (the ratio Rth (450)/(Rth(550)) of the compensation layer is preferably 0.90 or less, more preferably from 0.70 to 0.90, particularly more preferably from 0.75 to 0.90.

The difference between Rth(650) and Rth(550) (Rth(650)−Rth(550)) is preferably 5 nm or more, more preferably 10 nm or more, particularly more preferably 20 nm or more. The upper limit thereof is preferably 50 nm, more preferably 40 nm.

The ratio between Rth (650) and Rth (550) (the ratio Rth (650)/(Rth (550)) of the compensation layer is preferably 1.05 or more, more preferably from 1.05 to 1.20, particularly more preferably from 1.05 to 1.15.

The Nz coefficient (Nz coefficient=Rth(λ)/Re(λ)) of the compensation layer is also appropriately designed. The Nz coefficient is preferably from 2 to 20, more preferably from 2 to 10, particularly more preferably from 2 to 8.

The use of the compensation layer exhibiting retardation properties as described above makes it possible to compensate for the axis shift of the polarizers and the Rth of the liquid crystal cell satisfactorily to provide a liquid crystal panel excellent in viewing angle property.

The thickness of the compensation layer is appropriately set, considering the retardation thereof and so on, and is usually from about 1 to 150 μm, preferably from 5 to 150 μm, more preferably from 5 to 120 μm, particularly more preferably from 10 to 100 μm.

The material for forming the compensation layer in the invention is not particularly limited, and is preferably a material which exhibits reverse wavelength dispersion by itself. The compensation layer forming material is preferably selected from, for example, materials which give a relatively high birefringence when the compensation layer is made from each of the materials.

The compensation layer forming material is preferably, for example, a non-liquid-crystal material, in particular, a non-liquid-crystal polymer. The non-liquid-crystal material is different from, for example, any liquid crystal material, and forms a film having an optical monoaxiality of $nx_2>nz_2$ and $ny_2>nz_2$ by the nature of the material itself. Furthermore, the material exhibits an optical diaxiality of $nx_2>ny_2>nz_2$ by subjecting this film to drawing treatment. For this reason, as, for example, a substrate used to produce the compensation layer, an unaligned substrate can be used as well as an aligned substrate. Accordingly, it is possible to omit the step of applying an aligned film on the surface of the substrate, the step of laminating an aligned film, or any similar step.

Examples of the non-liquid-crystal polymer exhibiting reverse wavelength dispersion include modified cellulose polymers and vinyl alcohol polymers. A film containing the polymer exhibits reverse wavelength dispersion, and is turned to a film exhibiting an optical diaxiality of $nx_2>ny_2>nz_2$ by subjecting the film to a predetermined treatment.

Examples of the cellulose polymer include cellulose polymers described in JP-A-2002-82225, paragraphs [0106] to [0112] and others; and cellulose polymers described in Japanese Patent No. 3450779, paragraphs to [0034].

A cellulose polymer substituted with acetyl and propionyl groups may be used. In the cellulose polymer, the substitution degree of the acetyl group(s) can be represented by the "acetyl substitution degree (DSac)" meaning how many groups out of the three hydroxyl groups present in individual repeat units in the cellulose are substituted, on average, with one or more acetyl groups. The substitution degree of the propionyl group(s) can be represented by the "propionyl degree (DSpr)" meaning how many groups out of the three hydroxyl groups present in individual repeat units in the cellulose are substituted, on average, with one or more propionyl groups. The acetyl substitution degree (DSac) and the propionyl degree (DSpr) can be obtained by a method described in JP-A-2003-315538, paragraphs [0016] to [0019].

About the cellulose polymer that may be used in the invention, the acetyl substitution degree (DSac) and the propionyl degree (DSpr) thereof satisfy the following relationship expression: $2.0 \leq Dsac+DSpr \leq 3.0$. The lower limit of "DSac+DSpr" is preferably 2.3 or more, more preferably 2.6 or more. The upper limit of "DSac+DSpr" is preferably 2.9 or less, more preferably 2.8 or less. When "DSac+DSpr" of the cellulose polymer is set into this range, a compensation layer (optical retardation film) having desired optical properties can be effectively obtained in the case of using the cellulose polymer.

About the cellulose polymer, the propionyl substitution degree (DSpr) satisfies the following relationship expression: $1.0 \leq DSpr \leq 3.0$. The lower limit of the degree DSpr is preferably 2 or more, more preferably 2.5 or more. The upper limit of the degree DSpr is preferably 2.9 or less, more preferably 2.8 or less.

The cellulose polymer may have a substituent different from the acetyl and propionyl groups. Examples of the different substituent include ester groups such as butyrate; and ether groups such as alkyl ether groups and alkylene ether groups.

The cellulose polymer may have a substituent different from the acetyl and propionyl groups. Examples of the different substituent include ester groups such as butyrate; and ether groups such as alkyl ether groups and alkylene ether groups.

The number-average molecular weight of the cellulose polymer is preferably from 5,000 to 100,000, more preferably from 10,000 to 70,000. When the number-average molecular weight is set into the range, an excellent productivity and a good mechanical strength can be obtained.

The method adopted to substitute the hydroxyl group(s) with the acetyl and propionyl groups may be any appropriate method. An example thereof is a method of treating cellulose with a strong sodium hydroxide solution to prepare alkaline cellulose, and acylating this cellulose with a mixture of predetermined amounts of acetic anhydride and propionic anhydride. The substitution degree "DSac+DSpr" is adjusted by hydrolyzing the acyl groups partially.

A composition containing the cellulose polymer, an optional appropriate polymer material, and optional additives such as a plasticizer, a heat stabilizer, and an ultraviolet stabilizer is formed into a film form, whereby a target film can be formed.

Examples of the optional polymer material include cellulose esters such as cellulose butyrate; and cellulose ethers such as methylcellulose and ethylcellulose.

When the cellulose polymer is used, the thickness of the film made thereof is preferably from 50 to 150 μm, more preferably 60 to 140 μm, particularly more preferably from 70 to 130 μm.

The modified vinyl alcohol polymer may be a chain polymer having, as a repeat unit or repeat units, at least one of a structure represented by the following general formula I and a structure represented by the following general formula II:

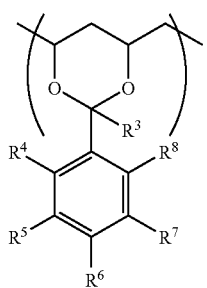

Formula I

In the general formula I, $R^3$ represents a hydrogen atom or an alkyl group having 1 to 8 carbon atoms. $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group provided that $R^4$ and $R^8$ are not simultaneously hydrogen atoms. $R^5$ to $R^7$ each independently represent a hydrogen atom or a substituent.

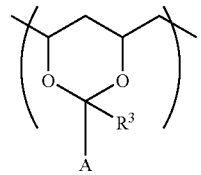

Formula II

In the general formula II, R3 represents a hydrogen atom or an alkyl group having 1 to 8 carbon atoms. A represents a naphthyl group which may have a substituent, an anthranyl group which may have a substituent, or a phenanthrenyl group which may have a substituent provided that one or more carbon atoms which constitute the naphthyl group, the anthranyl group or the phenanthrenyl group may be substituted with one or more nitrogen atoms.

A film containing a polymer having the repeat unit(s) exhibits reverse wavelength dispersion, and exhibits optical biaxiality by subjecting the film to drawing treatment or the like. The film using this polymer is described in detail in JP-A-2006-65258, paragraphs [0060] to [0084] (the general formulae I and II in the present specification correspond to the general formulae (V) and (VI) in the publication, respectively). The description in paragraphs [0060] to [0084] in the publication is incorporated herein in the specification by reference, so as to be omitted herein.

When a non-liquid-crystal polymer as described above is formed into a film form, the film can be used as the compensation layer.

The film can be obtained by any appropriate molding method. Examples of the molding method include compression molding, transfer molding, injection molding, extrusion molding, blow molding, powder molding, FRP molding, and solvent casting. The molding method is preferably solvent casting or extrusion molding. The solvent casting is, for example, a method of defoaming a concentrated solution (dope) wherein a composition containing a polymer as a main component and additives is dissolved in a solvent, casting the dope onto an endless stainless steel belt or the surface of a rotary drum, and then evaporating the solvent to form a film. The extrusion molding is, for example, a method of heating and melting a composition containing a polymer as a main component and additives, using a T die or the like to extrude the composition onto the surface of a casting roll, and then cooling the resultant to form a film. By the adoption of the methods, a film excellent in thickness evenness can be obtained.

The method adopted to draw the above-mentioned film may be any appropriate drawing method in accordance with a purpose. Examples of the drawing method include longitudinal monoaxial drawing, transverse monoaxial drawing, longitudinal and transverse biaxial simultaneous drawing, and longitudinal and transverse biaxial successive drawing. The means used to draw the film may be any appropriate drawing machine such as a roll drawing machine, a tenter drawing machine or a biaxial drawing machine. Preferably, the drawing machines each have a temperature controlling unit. When the film is drawn while heated, the internal temperature of the drawing machines may be continuously changed or may be stepwise changed. The drawing may be conducted in a single step or two or more separated steps. The drawing direction may be the longitudinal direction of the film, i.e., the machine direction (MD direction), or the width direction thereof, i.e., the transverse direction (TD direction). The film may be obliquely drawn (oblique drawing), using a drawing method illustrated in FIG. 1 in JP-A-2003-262721.

The temperature at which the film is drawn (the drawing temperature) is appropriately set in accordance with the kind of the film. The drawing is conducted preferably in the range of "the glass transition temperature (Tg) of the film ±30° C.". The selection of such a condition easily makes the retardation values even and further gives a film wherein crystallization (cloudiness) is not easily generated. Specifically, the temperature is preferably from 100 to 180° C., more preferably from 120 to 160° C. The glass transition temperature can be obtained by a DSC method in accordance with JIS K 7121 (1987).

A means for controlling the drawing temperature is not particularly limited, and examples thereof include an air-circulating thermostat oven wherein hot wind or cool wind is circulated, a heater using microwaves or far infrared rays, and a roll, heat pipe roll or metal belt heated for temperature adjustment.

The draw ratio of the film is appropriately set in accordance with a purpose. The draw ratio is preferably more than 1, and 3 or less, more preferably more than 1, and 2.5 or less, particularly more preferably from 1.1 to 2.0. The feed speed when the film is drawn is not particularly limited, and is preferably from 0.5 to 30 m/minute from the viewpoint of machine precision, stability and others. The drawing conditions give a film excellent in evenness as well as target optical properties.

About, for example, the above-mentioned cellulose film substituted with acetyl and propionyl groups, the drawing thereof is preferably conducted by biaxial successive drawing. By biaxial drawing, the cellulose film is turned to a film having an optical biaxiality of $nx_2>ny_2>nz_2$. In the biaxial successive drawing, the film is drawn in the longitudinal direction (or the width direction), and then drawn in the width direction (or the longitudinal direction). The drawing temperature is preferably in the range of "the glass transition temperature of the cellulose film ±30° C.".

<Polarizes>

Each of the polarizers that can be adopted in the liquid crystal panel of the invention may be any appropriate polarizer that can transmit linearly polarized light rays out of natural light rays or polarized light rays. The polarizer is preferably a drawn film made mainly of a vinyl alcohol polymer containing iodine or a dichroic dye. The thickness of the polarizer is usually from 5 to 50 μm. The drawn film, which is made mainly of a vinyl alcohol polymer containing iodine or a dichroic dye, can be obtained by, e.g., a method in Example 1 in JP-A-2003-240952.

The polarizer is preferably a polarizer having at least one surface on which a protective film is laminated. The protective film may be an appropriate film excellent in transparency. The protective film is used to prevent the polarizer from shrinking or swelling, or from being deteriorated by ultraviolet rays. The protective film is preferably a polymeric film containing a cellulose polymer or a norbornene polymer. The thickness of the protective film is usually from 10 to 200 μm.

<Liquid Crystal Display Device>

The liquid crystal panel of the invention is used in the state that the panel is incorporated into a liquid crystal display device. The liquid crystal display device may be of a transmission type, wherein light is radiated to a panel from the backside thereof to watch its screen, or of a reflection type, wherein light is radiated to a panel from the watching side thereof to watch its screen. The liquid crystal display device may be of a semi-transmission type, which has both natures of the transmission type and the reflection type.

The liquid crystal display device of the invention is used for a desired article.

The liquid crystal display device of the present invention is used for optional appropriate uses. Examples of the uses include office automation equipments such as a personal computer monitor, a notebook computer and a copying machine, portable equipments such as a portable telephone, a watch, a digital camera, a personal digital assistant (PDA) and a portable game machine, domestic electrical equipments such as a video camera, a television set and a microwave oven, on-vehicle equipments such as a back monitor, a monitor for a car navigation system and a car audio, display equipments such as an information monitor for a commercial store, security equipments such as an observation monitor, and care/medical equipments such as a care monitor and a medical monitor.

The uses of the liquid crystal display device of the present invention are preferably a television set. The screen size of the above-mentioned television set is preferably wide 17 type (373 mm×224 mm) or more, more preferably wide 23 type (499 mm×300 mm) or more and particularly preferably wide 32 type (687 mm×412 mm) or more.

About liquid crystal panels of the present invention, simulations were made as follows:

<Simulation Conditions>

A simulator software designed for liquid crystal display devices (trade name: LCD master, manufactured by Shintech Co.) was used to set parameters in the software as shown in Table 1.

TABLE 1

| Cell gap | | 3.2 μm |
|---|---|---|
| Pretilt | | 89 deg |
| Domains | | 4 domains |
| Applied voltage | Black | 0 V |
| | White | 5 V |
| Elastic constants | k1 | 10.1 |
| | k2 | 5.6 |
| | k3 | 14.7 |
| Dielectric constants | ep | 4.05 |
| | es | 6.51 |
| Rotational viscosity | g1 | 0.135 |
| Leslie constants | u1 | −0.018 |
| | u2 | −0.1235 |
| | u3 | 0.00115 |
| | u4 | 0.082 |
| | u5 | 0.0665 |
| | u6 | −0.0455 |

Reference Example 1

A liquid crystal panel of Reference Example 1 was made to have the following layer structure from the watching side thereof to the backside: polarizer/triacetylcellulose film/liquid crystal cell having a color filter and a liquid crystal layer/compensation layer/polarizer.

The liquid crystal cell was a VA mode. When the thickness of the liquid crystal layer was 3.2 μm, the cells exhibits Rth's in Table 2. As the compensation layer, a single retardation plate exhibiting reverse wavelength dispersion and optical biaxiality (its refractive index ellipsoid being one satisfying nx>ny>nz) was used.

The Rth's of the triactylcellulose film (referred to as the TAC hereinafter) and the compensation layer were set as shown in Table 2, and the Rth's of the color filter were added thereto (in the present simulation, the Rth's of the color filter were each set to zero, and in the same manner, the Rth's of the color filter were set to zero in each of Reference Examples 2, and Comparative Reference Examples 1 to 3). The optimal thicknesses of the individual color regions of the liquid crystal layer were then obtained.

The "Rth's of the VA mode liquid crystal layer at the optimal thicknesses" in Table 2 are Rth's of the individual color regions (B, G and R) when the thicknesses of the individual color regions of the liquid crystal layer were set to optimal thicknesses. For example, about the G regions (550 nm), the initial thickness of the liquid crystal layer and the optimized thickness of the liquid crystal layer were each 3.2 µm; therefore, the Rth's thereof were each −297.7 nm.

Figure 2A:
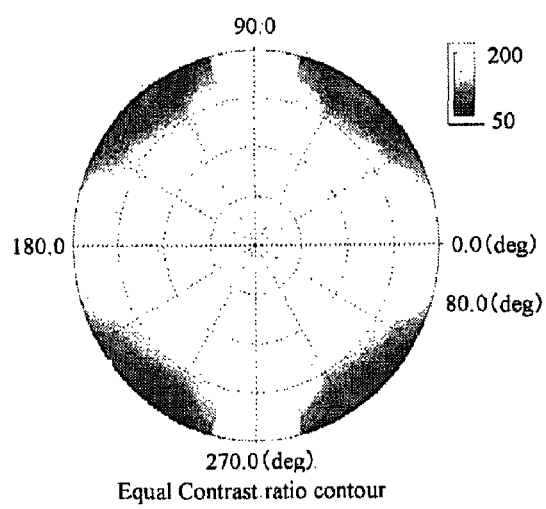
FIG. 2A is a contrast cone chart of a liquid crystal panel of Reference Example 1.

A contrast cone chart of the liquid crystal panel of Reference Example 1 is shown in FIG. 2A.

In the contrast cone chart, the center of the circle thereof shows the contrast when the panel was watched from the front side thereof. A point farther from the center of the circle shows the contrast when the panel was more obliquely watched (when the viewing angle was lower). The same matter is applied to contrast cone charts of Reference Example 2 and Comparative Reference Examples 1 to 3.

Figure 2B:
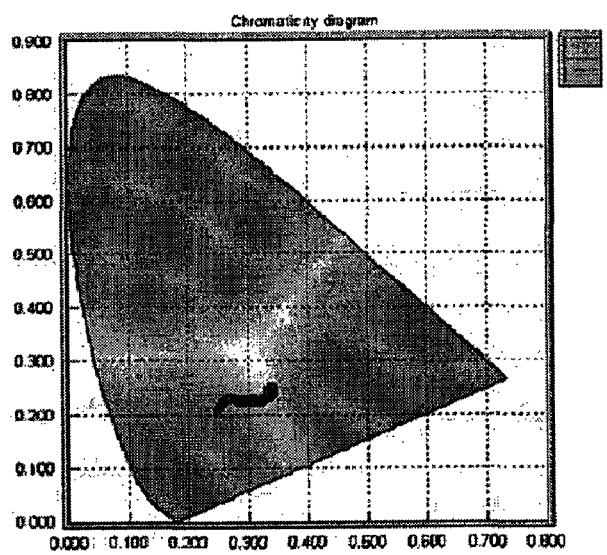
FIG. 2B is a color shift chart of the liquid crystal panel in accordance with a polar angle change.
Figure 2C:
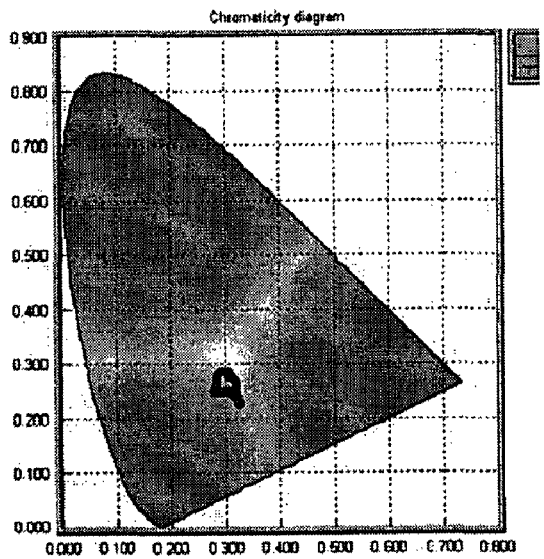
FIG. 2C is a color shift chart of the liquid crystal panel in accordance with an azimuthal angle change.

FIG. 2B shows the color shift of the liquid crystal panel of Reference Example 1 with a change in the polar angle (the color shift when the polar angle was changed), and FIG. 2C shows the color shift of the liquid crystal panel of Reference Example 1 with a change in the azimuthal angle (the color shift when the azimuthal angle was changed), respectively.

About the change in the polar angle, plotted are xy values when the azimuthal angle was set to 45° and the viewing angle was inclined successively from 0 to 80°. About the change in the azimuthal angle, plotted are xy values when the polar angle was set to 60° and the azimuthal angle was inclined successively from 0 to 360° C. The same matters are applied to Reference Example 2 and Comparative Reference Examples 1 to 3. About each of the polar angle change and the azimuthal angle change, the color shift (color change) is smaller as the shift of a point on each of the chromaticity diagrams (the trace of the point is represented by a black solid line in each of the diagrams) is smaller.

As illustrated in FIG. 2A, it is understood that the liquid crystal panel of Reference Example 1 had a large area of white regions to give a wide viewing angle. The color shift of the liquid crystal panel of Reference Example 1 was smaller than that of Comparative Reference Example 1, as shown in FIGS. 2B and 2C.

In the liquid crystal panel of Reference Example 1, a retardation plate exhibiting reverse wavelength dispersion was used as the compensation layer and the absolute values of the Rth's of the individual color regions (B, G, R) satisfied the relationship of |Rth(B)|<|Rth(G)|<|Rth(R)|. Specifically, in the column of "Rth's of the VA mode liquid crystal layer at the optimal thicknesses" in Table 2, the absolute values of the Rth's of the individual color regions (B, G, R) satisfied a relationship of |−249.4|<|−297.7|<|−313.8|. This liquid crystal panel can make the viewing angle thereof wide and make the color shift thereof low.

TABLE 2

|  |  | B(440 nm) | G(550 nm) | R(610 nm) |
|---|---|---|---|---|
| Reference Example 1 | Rth's (nm) of the VA mode liquid crystal layer (3.2 µm in thickness) | −318.2 | −297.7 | −291.7 |
|  | Rth's (nm) of the TAC | 55 | 60 | 62 |
|  | Rth's (nm) of the compensation layer (a single layer exhibiting reverse wavelength dispersion) | 195 | 238 | 252 |
|  | The total (nm) of the Rth's of the TAC, the compensation layer and the color filter | 250 | 298 | 314 |
|  | Optimal thicknesses (µm) of the individual color regions of the liquid crystal layer | 2.51 | 3.20 | 3.44 |
|  | Rth's (nm) of the VA mode liquid crystal layer at the optimal thicknesses | −249.4 | −297.7 | −313.8 |
| Reference Example 2 | Rth's (nm) of the VA mode liquid crystal layer (3.2 µm in thickness) | −318.2 | −297.7 | −291.7 |
|  | Rth's (nm) of the TAC | 0 | 0 | 0 |
|  | Rth's (nm) of the compensation layer (two layers exhibiting reverse wavelength dispersion) | 271 | 298 | 307 |
|  | The total (nm) of the Rth's of the TAC, the compensation layer and the color filter | 271 | 298 | 307 |
|  | Optimal thicknesses (µm) of the individual color regions of the liquid crystal layer | 2.73 | 3.20 | 3.37 |
|  | Rth's (nm) of the VA mode liquid crystal layer at the optimal thicknesses | −271.2 | −297.7 | −306.9 |

Reference Example 2

A liquid crystal panel of Reference Example 2 was made to have the following layer structure from the watching side thereof to the backside: polarizer/compensation layer/liquid crystal cell having a color filter and a liquid crystal layer/compensation layer/polarizer.

As each of the compensation layers arranged on both sides of the liquid crystal cell, a single retardation plate exhibiting reverse wavelength dispersion and optical biaxiality (its refractive index ellipsoid being one satisfying nx>ny>nz) was used.

The Rth's of the compensation layer were set as shown in Table 2, and the Rth's of the color filter were added thereto (in the present simulation, the Rth's of the color filter were each set to zero). The optimal thicknesses of the individual color regions of the liquid crystal layer were then obtained. Thereafter, in the same way as in Reference Example 1, a simulation was made.

Figure 3A:
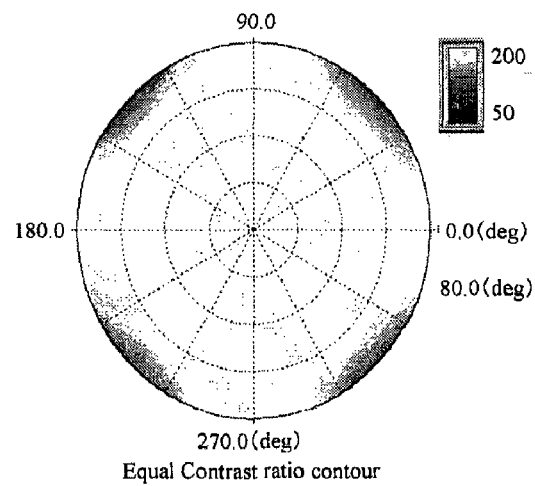
FIG. 3A is a contrast cone chart of a liquid crystal panel of Reference Example 2.
Figure 3B:
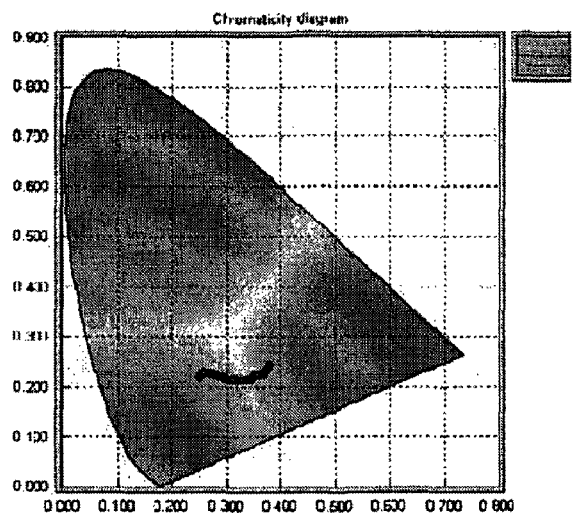
FIG. 3B is a color shift chart of the liquid crystal panel in accordance with a polar angle change.
Figure 3C:
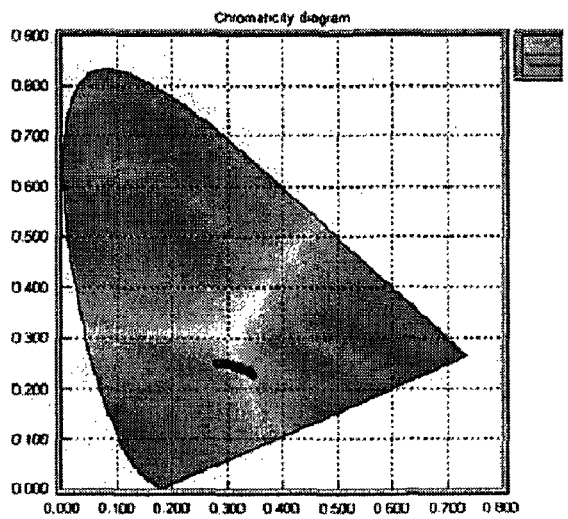
FIG. 3C is a color shift chart of the liquid crystal panel in accordance with an azimuthal angle change.

FIG. 3A shows a contrast cone chart of the liquid crystal panel of Reference Example 2, FIG. 3B shows the color shift of the liquid crystal panel in accordance with a change in the polar angle, and FIG. 3C shows the color shift of the liquid crystal panel in accordance with a change in the azimuthal angle, respectively.

It is understood that the liquid crystal panel of Reference Example 2 had a large area of white regions to give a wide viewing angle in the same manner as that of Reference Example 1. The color shift of the liquid crystal panel of Reference Example 2 was smaller than that of Comparative Reference Example 2, as shown in FIGS. 3B and 3C.

In the liquid crystal panel of Reference Example 2, a retardation plate exhibiting reverse wavelength dispersion was used as the compensation layer and the absolute values of the Rth's of the individual color regions (B, G, R) satisfied the relationship of |Rth(B)|<|Rth(G)|<|Rth(R)|. Specifically, in the column of "Rth's of the VA mode liquid crystal layer at the optimal thicknesses" in Table 2, the absolute values of the Rth's of the individual color regions (B, G, R) satisfied a relationship of |−271.2|<|−297.7|<|−306.9|. This liquid crystal panel can make the viewing angle thereof wide and make the color shift thereof low.

Comparative Reference Example 1

A liquid crystal panel of Comparative Reference Example 1 was made to have the following layer structure from the watching side thereof to the backside: polarizer/TAC's (two films)/color filter/liquid crystal cell/compensation layer/polarizer.

In Comparative Reference Example 1, two laminated TAC's were used, and a single retardation plate exhibiting normal wavelength dispersion (wavelength dispersion that a smaller retardation is given for a longer invention) and optical biaxiality (its refractive index ellipsoid being one satisfying nx>ny>nz) was used as the compensation layer.

In order to compare the present example with Reference Example 1, the optimal thicknesses of the individual color regions of the liquid crystal layer were set in the same way as in Reference Example 1, as shown in Table 3 (in Comparative Reference Example 1 in Table 3, the optimal thicknesses of the regions B (440 nm), that of the regions G (550 nm) and that of the regions R (610 nm) were set to "2.51 μm", "3.20 μm", and "3.44 μm", respectively). Under the condition, a simulation was made.

Figure 4A:
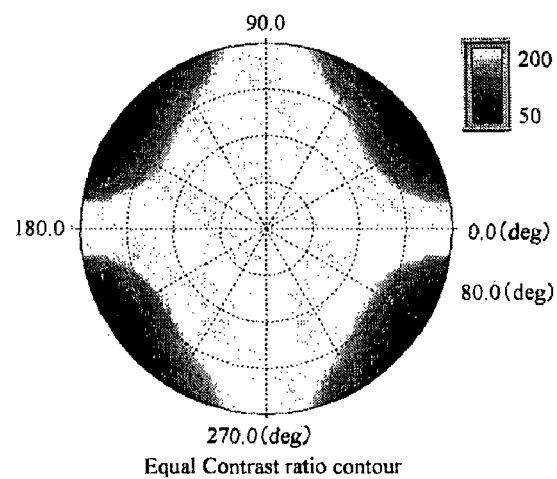
FIG. 4A is a contrast cone chart of a liquid crystal panel of Comparative Reference Example 1.
Figure 4B:
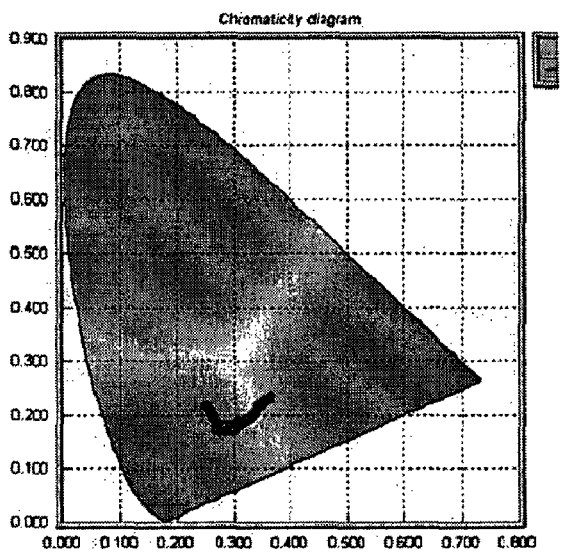
FIG. 4B is a color shift chart of the liquid crystal panel in accordance with a polar angle change.
Figure 4C:
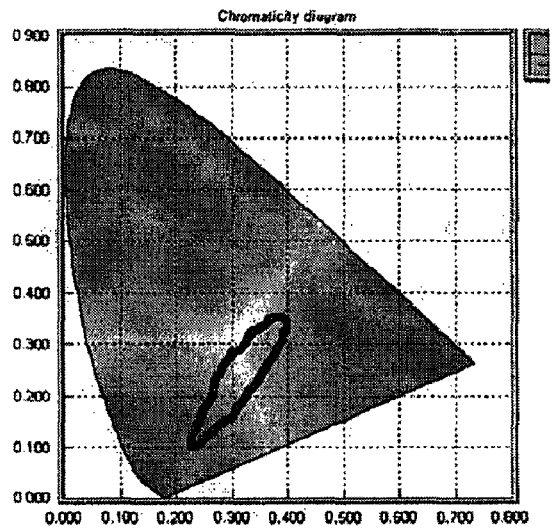
FIG. 4C is a color shift chart of the liquid crystal panel in accordance with an azimuthal angle change.

FIG. 4A shows a contrast cone chart of the liquid crystal panel of Comparative Reference Example 1, FIG. 4B shows the color shift of the liquid crystal panel in accordance with a change in the polar angle, and FIG. 4C shows the color shift of the liquid crystal panel in accordance with a change in the azimuthal angle, respectively.

As is evident form FIG. 4A, it is understood that the liquid crystal panel of Comparative Reference Example 1 had a large area of black regions to give a narrow viewing angle. The color shift of the liquid crystal panel of Comparative Reference Example 1 was larger than that of Reference Example 1, as shown in FIGS. 4B and 4C.

In the liquid crystal panel of Comparative Reference Example 1, a retardation plate exhibiting normal wavelength dispersion was used as the compensation layer and the absolute values of the Rth's of the individual color regions (B, G, R) satisfied the relationship of |Rth(B)|<|Rth(G)|<|Rth(R)|. Specifically, in the column of "Rth's of the VA mode liquid crystal layer at the optimal thicknesses" in Table 3, the absolute values of the Rth's of the individual color regions (B, G, R) satisfied a relationship of |−249.4|<|−297.7|<|−313.8|. This liquid crystal panel can neither make the viewing angle thereof wide nor make the color shift thereof low since the compensation layer exhibits normal wavelength dispersion.

TABLE 3

|  |  | B(440 nm) | G(550 nm) | R(610 nm) |
|---|---|---|---|---|
| Comparative Reference Example 1 | Rth's (nm) of the VA mode liquid crystal layer (3.2 μm in thickness) | −318.2 | −297.7 | −291.7 |
|  | Rth's (nm) of the TAC | 109 | 120 | 124 |
|  | Rth's (nm) of the compensation layer (a single layer exhibiting normal wavelength dispersion) | 201 | 178 | 171 |
|  | The total (nm) of the Rth's of the TAC, the compensation layer and the color filter | 310 | 298 | 295 |
|  | Optimal thicknesses (μm) of the individual color regions of the liquid crystal layer | 2.51 | 3.20 | 3.44 |
|  | Rth's (nm) of the VA mode liquid crystal layer at the optimal thicknesses | −249.4 | −297.7 | −313.8 |
| Comparative Reference Example 2 | Rth's (nm) of the VA mode liquid crystal layer (3.2 μm in thickness) | −318.2 | −297.7 | −291.7 |
|  | Rth's (nm) of the TAC | 0 | 0 | 0 |
|  | Rth's (nm) of the compensation layer (two layers exhibiting normal wavelength dispersion) | 337 | 298 | 287 |
|  | The total (nm) of the Rth's of the TAC, the compensation layer and the color filter | 337 | 298 | 287 |
|  | Optimal thicknesses (μm) of the individual color regions of the liquid crystal layer | 2.73 | 3.20 | 3.37 |
|  | Rth's (nm) of the VA mode liquid crystal layer at the optimal thicknesses | −271.2 | −297.7 | −306.9 |

TABLE 3-continued

|  |  | B(440 nm) | G(550 nm) | R(610 nm) |
|---|---|---|---|---|
| Comparative Reference Example 3 | Rth's (nm) of the VA mode liquid crystal layer (3.2 μm in thickness) | −318.2 | −297.7 | −291.7 |
|  | Rth's (nm) of the TAC | 55 | 60 | 62 |
|  | Rth's (nm) of the compensation layer (a single layer exhibiting reverse wavelength dispersion) | 195 | 238 | 252 |
|  | The total (nm) of the Rth's of the TAC, the compensation layer and the color filter | 250 | 298 | 314 |
|  | Optimal thicknesses (μm) of the individual color regions of the liquid crystal layer | 3.20 | 3.20 | 3.20 |
|  | Rth's (nm) of the VA mode liquid crystal layer at the optimal thicknesses | −318.2 | −297.7 | −291.7 |

Comparative Reference Example 2

A liquid crystal panel of Comparative Reference Example 2 was made to have the following layer structure from the watching side thereof to the backside: polarizer/compensation layer/color filter/liquid crystal cell/compensation layer/polarizer.

In Comparative Reference Example 2, as each of the compensation layers arranged on both sides of the liquid crystal cell, a single retardation plate exhibiting normal wavelength dispersion and optical biaxiality (its refractive index ellipsoid being one satisfying nx>ny>nz) was used. This matter was equal to a matter that two retardation plates exhibiting normal wavelength dispersion were used as the compensation layers.

In order to compare Comparative Reference Example 2 with Reference Example 2, the optimal thicknesses of the individual color regions of the liquid crystal layer were set in the same way as in Reference Example 2, as shown in Table 3 (in Comparative Reference Example 2 in Table 3, the optimal thicknesses of the regions B (440 nm), that of the regions G (550 nm) and that of the regions R (610 nm) were set to "2.73 μm", "3.20 μm", and "3.37 μm", respectively). Under the condition, a simulation was made.

Figure 5A:
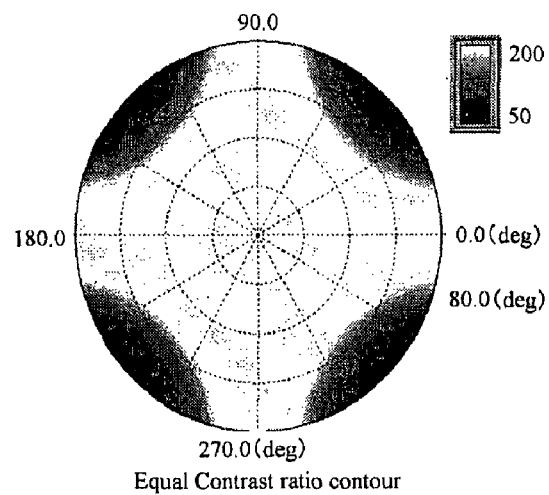
FIG. 5A is a contrast cone chart of a liquid crystal panel of Comparative Reference Example 2.
Figure 5B:
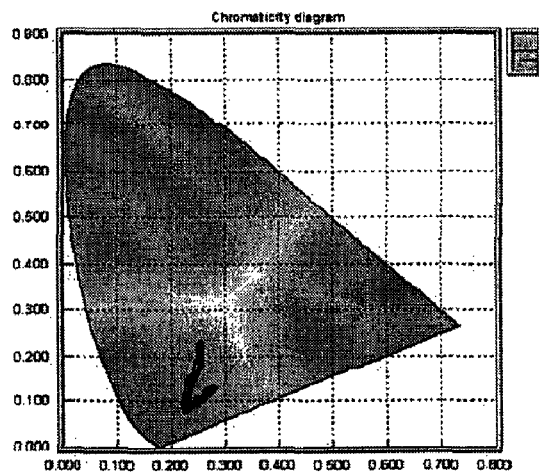
FIG. 5B is a color shift chart of the liquid crystal panel in accordance with a polar angle change.
Figure 5C:
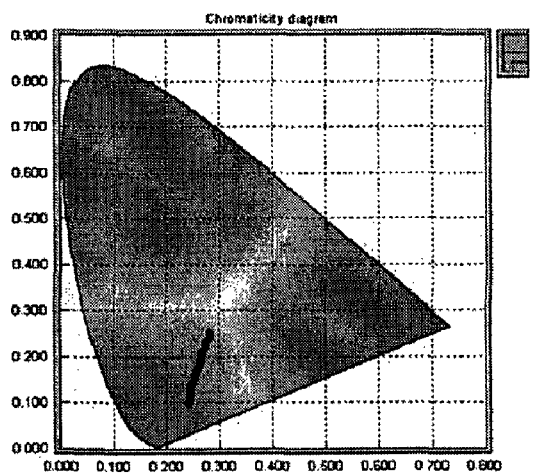
FIG. 5C is a color shift chart of the liquid crystal panel in accordance with an azimuthal angle change.

FIG. 5A shows a contrast cone chart of the liquid crystal panel of Comparative Reference Example 2, FIG. 5B shows the color shift of the liquid crystal panel in accordance with a change in the polar angle, and FIG. 5C shows the color shift of the liquid crystal panel in accordance with a change in the azimuthal angle, respectively.

As is evident form FIG. 5A, it is understood that the liquid crystal panel of Comparative Reference Example 2 had a large area of black regions to give a narrow viewing angle. The color shift of the liquid crystal panel of Comparative Reference Example 2 was larger than that of Reference Example 2, as shown in FIGS. 5B and 5C.

In the liquid crystal panel of Comparative Reference Example 2, a retardation plate exhibiting normal wavelength dispersion was used as the compensation layer and the absolute values of the Rth's of the individual color regions (B, G, R) satisfied the relationship of |Rth(B)|<|Rth(G)|<|Rth(R)|. Specifically, in the column of "Rth's of the VA mode liquid crystal layer at the optimal thicknesses" in Table 3, the absolute values of the Rth's of the individual color regions (B, G, R) satisfied a relationship of |−271.2|<|−297.7|<|−306.9|. This liquid crystal panel can neither make the viewing angle thereof wide nor make the color shift thereof low since the compensation layers exhibit normal wavelength dispersion.

Comparative Reference Example 3

A liquid crystal panel of Comparative Reference Example 3 was made to have the following layer structure from the watching side thereof to the backside: polarizer/TAC/color filter/liquid crystal cell/compensation layer/polarizer.

In Comparative Reference Example 3, a single TAC was used, and a single retardation plate exhibiting reverse wavelength dispersion and optical biaxiality (its refractive index ellipsoid being one satisfying nx>ny>nz) was used as the compensation layer.

In order to compare the present example with Reference Examples 1 and 2, all of the optimal thicknesses of the individual color regions of the liquid crystal layer were set to the same value, as shown in Table 3 (in Comparative Reference Example 3 in Table 3, the optimal thicknesses of the regions B (440 nm), that of the regions G (550 nm) and that of the regions R (610 nm) were each set to "3.20 μm"). Under the condition, a simulation was made.

Figure 6A:
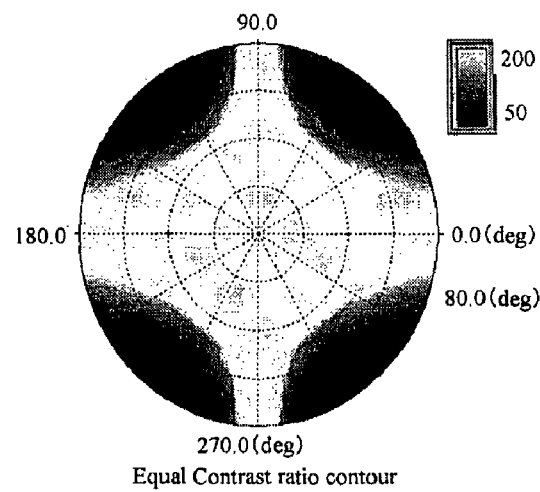
FIG. 6A is a contrast cone chart of a liquid crystal panel of Comparative Reference Example 3.
Figure 6B:
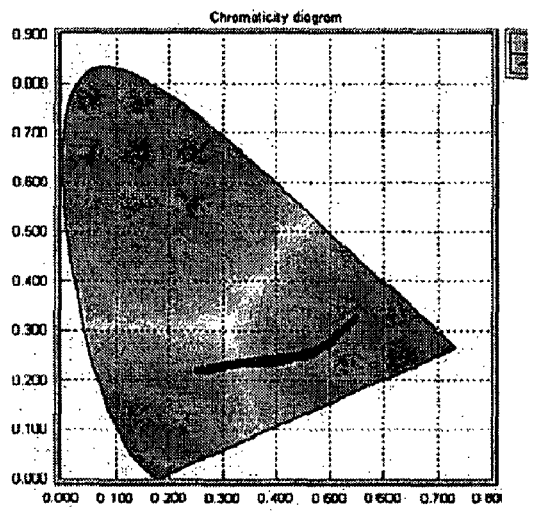
FIG. 6B is a color shift chart of the liquid crystal panel in accordance with a polar angle change.
Figure 6C:
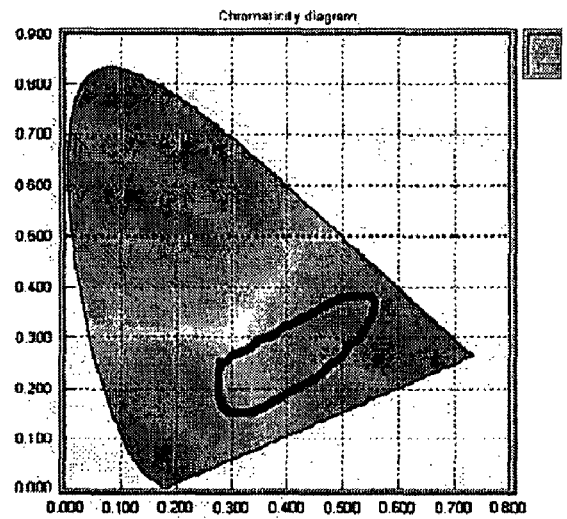
FIG. 6C is a color shift chart of the liquid crystal panel in accordance with an azimuthal angle change.

FIG. 6A shows a contrast cone chart of the liquid crystal panel of Comparative Reference Example 3, FIG. 6B shows the color shift of the liquid crystal panel in accordance with a change in the polar angle, and FIG. 6C shows the color shift of the liquid crystal panel in accordance with a change in the azimuthal angle, respectively.

As is evident form FIG. 6A, it is understood that the liquid crystal panel of Comparative Reference Example 3 had a large area of black regions to give a narrow viewing angle. The color shift of the liquid crystal panel of Comparative Reference Example 3 was larger than that of Reference Examples 1 and 2, as shown in FIGS. 6B and 6C.

In the liquid crystal panel of Comparative Reference Example 3, a retardation plate exhibiting reverse wavelength dispersion was used as the compensation layer and the absolute values of the Rth's of the individual color regions (B, G, R) satisfied a relationship of |Rth(B)|>|Rth(G)|>|Rth(R)|. Specifically, in the column of "Rth's of the VA mode liquid crystal layer at the optimal thicknesses" in Table 3, the absolute values of the Rth's of the individual color regions (B, G, R) satisfied a relationship of |−318.2|≧|−297.7|≧|−291.7|. This liquid crystal panel does not satisfy the relationship of |Rth(B)|<|Rth(G)|<|Rth(R)|; thus, the panel can neither make the viewing angle thereof wide nor make the color shift thereof low even if the compensation layer exhibits reverse wavelength dispersion.

What is claimed is:

1. A liquid crystal panel, comprising a liquid crystal cell having a color filter having individual blue, green and red color regions, a first polarizer formed on one side of the liquid crystal cell, a second polarizer formed on the other side of the liquid crystal cell, and a compensation layer arranged between the first and second polarizers, wherein the liquid crystal panel is of a transmission type,
wherein the compensation layer has an optical characteristic that the layer gives a larger in-plane retardation and a larger thickness direction retardation for a longer wavelength, and
the liquid crystal cell has a liquid crystal layer in a vertical alignment mode, and the thickness direction retardation values Rth(B), Rth(G) and Rth(R) of the liquid crystal cell to light transmitted through the individual color regions in the liquid crystal cell satisfy the following relationship: |Rth(B)|<|Rth(G)|<|Rth(R)| wherein Rth(B) represents the thickness direction retardation value of the liquid crystal cell to light transmitted through the blue regions of the cell and having a wavelength of 450 nm, Rth(G) represents the thickness direction retardation value of the liquid crystal cell to light transmitted through the green regions of the cell and having a wavelength of 546 nm, and Rth(R) represents the thickness direction retardation value of the liquid crystal cell to light transmitted through the red regions of the cell and having a wavelength of 633 nm, provided that any thickness direction retardation value Rth is represented by the following expression: $Rth=[\{(nx_1+ny_1)/2\}-nz_1] \times d_1$ wherein $nx_1$ represents the refractive index of the liquid crystal cell in the X axis direction in the plane of the cell (i.e., the direction along which the refractive index is maximum in the plane), $ny_1$ represents the refractive index of the liquid crystal cell in the Y axis direction in the plane of the cell (i.e., the direction perpendicular to the X axis in the plane), $nz_1$ represents the refractive index of the liquid crystal cell in the direction perpendicular to the X axis direction and the Y axis direction, and $d_1$ represents the thickness [nm] of the liquid crystal cell.

2. The liquid crystal panel according to claim 1, wherein the compensation layer is a single layer.

3. The liquid crystal panel according to claim 1, wherein the liquid crystal cell is formed to satisfy Db<Dg<Dr wherein Db represents the thickness of the liquid crystal layer corresponding to the blue regions, Dg represents the thickness of the liquid crystal layer corresponding to the green regions, and Dr represents the thickness of the liquid crystal layer corresponding to the red regions.

4. The liquid crystal panel according to claim 1, wherein the compensation layer is a layer exhibiting an optical characteristic satisfying $nx_2>ny_2>nz_2$ wherein $nx_2$ represents the refractive index of the compensation layer in the X axis direction in the plane of the layer (i.e., the direction along which the refractive index is maximum in the plane), $ny_2$ represents the refractive index of the compensation layer in the Y axis direction in the plane of the layer (i.e., the direction perpendicular to the X axis in the plane), and $nz_2$ represents the refractive index of the compensation layer in the direction perpendicular to the X axis direction and the Y axis direction.

5. The liquid crystal panel according to claim 1, wherein the compensation layer is formed on the side of a backlight for the liquid crystal cell.

6. The liquid crystal panel according to claim 1, wherein the compensation layer comprises a cellulose film.

7. The liquid crystal panel according to claim 1, wherein the compensation layer comprises a film having an aligned chain polymer having, as a repeat unit or repeat units, at least one of a structure represented by the following general formula I and a structure represented by the following general formula II:

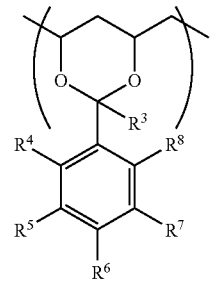

Formula I wherein $R^3$ represents a hydrogen atom or an alkyl group having 1 to 8 carbon atoms; $R^4$ and $R^8$ each independently represent a hydrogen atom, a linear or branched alkyl group having 1 to 4 carbon atoms, a linear or branched alkoxy group having 1 to 4 carbon atoms, a linear or branched thioalkoxy group having 1 to 4 carbon atoms, a halogen, a nitro group, an amino group, a hydroxyl group, or a thiol group provided that $R^4$ and $R^8$ are not simultaneously hydrogen atoms; and $R^5$ to $R^7$ each independently represent a hydrogen atom or a substituent,

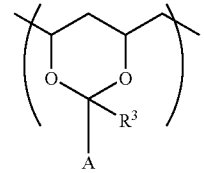

Formula II wherein R3 represents a hydrogen atom or an alkyl group having 1 to 8 carbon atoms, and A represents a naphthyl group which may have a substituent, an anthranyl group which may have a substituent, or a phenanthrenyl group which may have a substituent provided that one or more carbon atoms which constitute the naphthyl group, the anthranyl group or the phenanthrenyl group may be substituted with one or more nitrogen atoms.

8. A liquid crystal display device having the liquid crystal panel according to claim 1.

* * * * *